Oct. 17, 1950 — D. A. McCOY — 2,526,493
INTRAOCULAR LOCALIZER EMBODYING A UNIVERSAL LEVEL
Filed Oct. 9, 1947
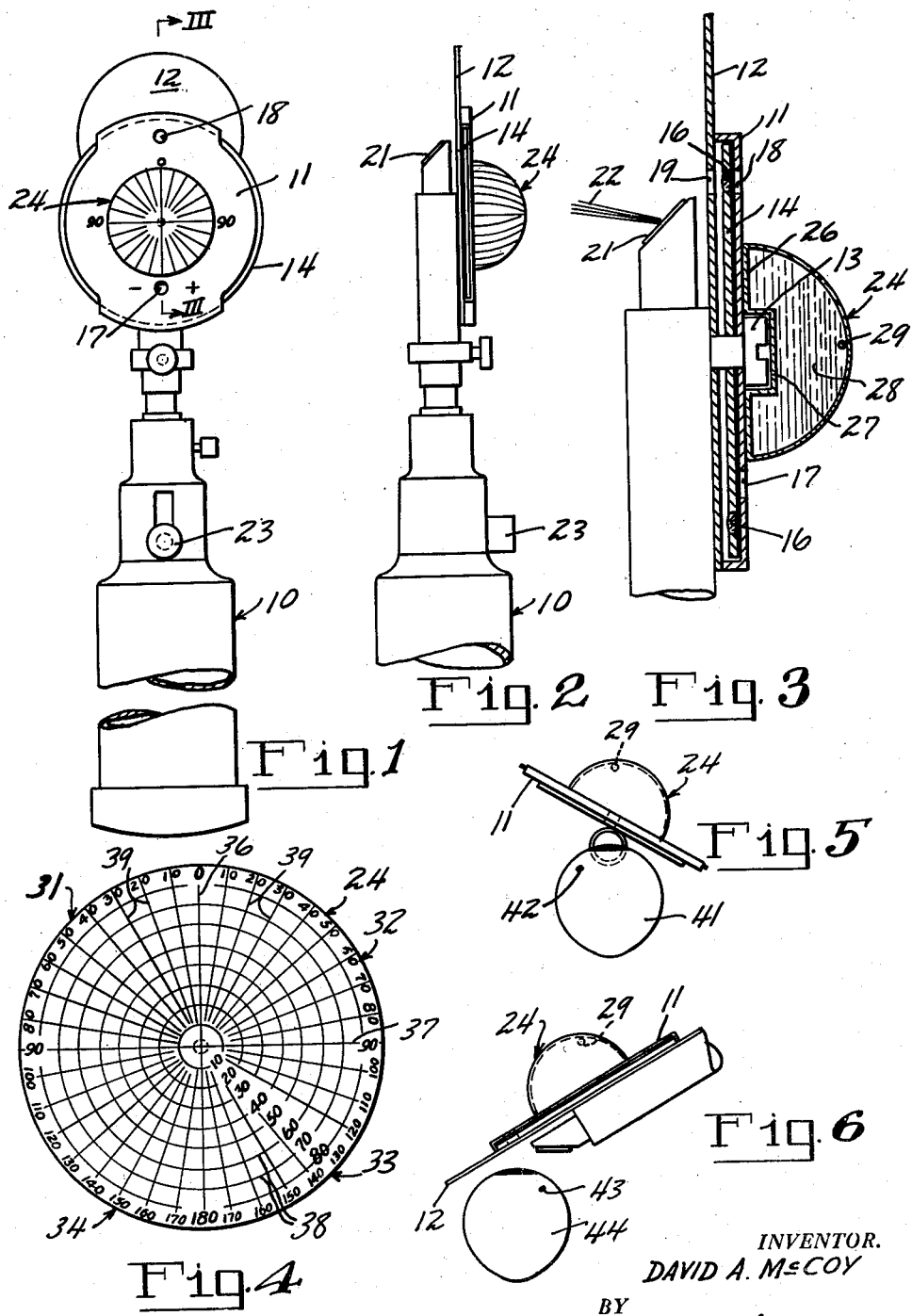
INVENTOR.
DAVID A. McCOY
BY Henry L. Jennings
Attorney Patented Oct. 17, 1950

2,526,493

UNITED STATES PATENT OFFICE 2,526,493

INTRAOCULAR LOCALIZER EMBODYING A UNIVERSAL LEVEL

David A. McCoy, Birmingham, Ala.

Application October 9, 1947, Serial No. 778,865

5 Claims. (Cl. 88—20)

My present invention relates to an instrument for localizing foreign bodies in the eyes comprising an ophthalmoscope embodying a hemispherical universal level mounted thereon with its polar axis parallel to the line of vision through the observation aperture of the ophthalmoscope, whereby the operator may obtain directly a three dimensional angular reading which represents the exact location of the foreign body in the eye.

Another object of my invention is to provide an instrument of the character designated in which the universal level comprises a hemispherical bulb of a diameter closely approximating the diameter of the human eye, whereby the position of the bubble when a reading is taken is representative of the actual distances involved in the eye itself, thus giving the operator a true size picture of the location of the foreign body as well as its position.

Another object of my invention is to provide an intra-ocular localizer of the character designated in which the hemispherical bulb forming the universal level is divided into four equiangular quadrants by reference lines, and in which the quadrants are subdivided by other reference lines to indicate angular distance in a horizontal plane from a common zero, and angular distances from a zero point at the top of the bulb.

A further object of my invention is to so arrange the reference lines on the bulb that the instrument reads correctly when used to locate foreign bodies in either the left or right eye, and to so mount the universal level as not to interfere with the operator obtaining an unrestricted view into the eye.

Apparatus embodying the features of my invention is illustrated in the accompanying drawing forming a part of this application in which:

Fig. 1 is a plan view of an ophthalmoscope embodying my invention;

Fig. 2 is a side view thereof;

Fig. 3 is an enlarged detail sectional view taken along the line III—III of Fig. 1;

Fig. 4 is a further enlarged plan view of the universal level drawn as if the same were flat instead of hemispherical, the better to illustrate the position of the reference lines and numerals applied thereto;

Fig. 5 is a somewhat diagrammatic end view illustrating the instrument in use to localize a foreign body in the lower part of the right eyeball; and, Fig. 6 is a fragmental diagrammatic side view showing the instrument in use to localize a foreign body in a side of the eyeball.

Referring now to the drawings for a better understanding of my invention, I have illustrated a well known standard make of ophthalmoscope comprising a handle and battery case 10. On the opposite end, the instrument is provided with a holder 11 having an extension plate or nose piece 12 by means of which the instrument is rested or steadied against the side of the observer's nose when the same is in use in the manner later to be described. Within the holder 11, and pivotally mounted about the shank of a centrally disposed screw 13 is a lens disc 14. As is well understood, the lens disc 14 has mounted adjacent its periphery a plurality of lenses 16. On the side of the screw 13 opposite the nose piece 12 the holder is provided with a small aperture 17 through which the number of the lens selected by rotation of the disc may be viewed. Between the screw 13 and the end of the nose piece 12 the holder and nose piece are provided with apertures 18 and 19, respectively, through which the operator looks, viewing the eye through the lens 16.

The end of the instrument beneath the holder 11 is provided with an angularly disposed prism and lens 21 by means of which a concentrated beam of light from a small incandescent lamp (not shown) mounted within the instrument is caused to be reflected as indicated by the lines 22. The lamp is energized by means of a sliding switch 23, current being supplied by batteries carried in the handle 10.

The instrument described so far is of a well known standard make, the details of which form no part of my invention. That part of the mechanism by means of which the exact angular location of foreign bodies in the eye may be obtained will now be described.

Secured to the top side of the holder 11 rearwardly of the apertures 18 and 19 as by cementing the same thereon, is a closed hemispherical bulb 24 formed of glass, transparent plastic, or other suitable transparent material. The base 26 of the bulb may be provided with an inset portion 27 to provide clearance for the head of the screw 13. The bulb is entirely filled with a liquid 28 with the exception that a small air bubble 29 is provided. The bulb is mounted so that its polar axis is parallel to the line of vision through the observation apertures 18 and 19. It will be apparent, therefore, that the bubble 29 is free to move about beneath the inner curved wall of the hemispherical bulb and that longitudinal and transverse deviation of the instrument from a horizontal plane may be determined from the position of the bubble within the bulb.

Referring now more particularly to Fig. 4 of the drawing, it will be seen that the outer surface of the bulb 24 is divided into four equiangular quadrants 31, 32, 33, and 34 by means of a pair of lines 36 and 37 intersecting at 90 degrees at the top of the bulb. The line 36 extends parallel to the long axis of the instrument as a whole and the line 37 extends transversely thereof. Commencing at the point of intersection of the lines 36 and 37 at the top of the bulb 24, I draw a plurality of concentric circles 38 which may conveniently be laid out 10 degrees apart. Commencing at the point marked 0 at the end of the line 36 nearest the observation aperture, I subdivide each of the quadrants radially into 10 degree increments by means of lines 39. Therefore, commencing at the point 0 and reading either clockwise or counterclockwise the quadrants 31—34 and 32—33 read from 0 to 180°.

Referring now more particularly to Figs. 5 and 6 the method of using my improved localizer may be readily understood. Let it be supposed that the eyeball 41 has a small foreign body 42 in the lower part. The patient's head is tilted backwardly until his normal line of vision is substantially vertical. The operator rests the nosepiece 12 against the side of his nose, and, having selected the correct lens 16 by rotating the lens disc 14, looks into the eye through the apertures 18 and 19 and the lens 16, the incandescent lamp providing the necessary light. The instrument is moved until the foreign object 42 is visible through the apertures 18 and 19. The instrument is now held steady, and, by referring to the position of the bubble 29 relative to the reference lines on the bulb 24, an accurate and definite reading in degrees of the location of the foreign body is obtained. The reading may be reduced to millimeters, thus converting the same to the terms generally used in ophthalmic work.

Referring to Fig. 6 of the drawing, it is assumed that a foreign body 43 is located in the eyeball 44 adjacent the side thereof. The operator positions the instrument, and raises the handle 10 until he is able to see the foreign body through the apertures 18 and 19. He thereupon reads the position of the bubble 29 and the correct angular position of the foreign body is obtained.

It will be apparent that any combination of angularity of the instrument with respect to the horizontal and vertical can be read, thus locating a foreign body in any part of the eye, limited only by the ability of the instrument's beam of light to illuminate the very peripheral anterior segments through a dilated pupil, since the bubble 29 rises to the highest point on the inner wall of the bulb 24. Therefore, in the event it is necessary to enter the eye to remove the foreign body, its exact position is determined by pre-operative examination and unnecessary probing of the eyeball is eliminated.

By reason of the division of the bulb 24 into quadrants lying both to the right and left of the longitudinal center line of the instrument, and by making the 0 point adjacent the nose plate 12, and apertures 18 and 19, I obtain both a right and lefthand instrument. That is to say, the angularity determined by the radial reference lines 39 is always somewhere between 0 and 180°, regardless of whether the right or left eye is being examined. Thus, if a foreign body is present in the lower part of the right eye the bubble will come to rest in quadrant 32 or 33, and if it is in the upper part of the right eye the bubble will come to rest in quadrant 31 or 34. If in the lower part of the left eye, the reading is in quadrant 31 or 34, and if in the upper part of the left eye, in quadrant 32 or 33. The general position of the foreign body visible to the operator is known, since he can readily determine whether or not the same is in the upper or lower half of the eye, or the right or left side thereof. By providing the ophthalmoscope with my improved hemispherical type of universal level the exact position of a foreign body may be read directly by reference to the position of the bubble with respect to the radial and vertical division lines.

From the foregoing it will be apparent that I have devised an improved intra-ocular localizer which is both simple and effective for its intended purposes. It is to be especially noted that the bulb 24 is of such size as to correspond closely to the size of the human eye, that is, approximately 1⅜ inch in diameter. The operator, therefore, obtains a reading on a transparent scale which in shape and size corresponds to the shape and size of the eye and therefore obtains directly from this reading a true size picture of the location of the foreign body with respect to the eye. It is to be further noted that the bulb 24 in no way interferes with the normal use of the ophthalmoscope, since it is of such size and so positioned as not to interfere with the view of the operator when looking through the apertures 18 and 19. Since the polar axis of the bulb is parallel with the line of the operator's sight through the observation aperture, the reading obtained by the position of the bubble is accurate within very close tolerances. In actual operation, I have found that an instrument made in accordance with my invention is extremely useful, particularly in those cases where it is necessary to enter the eye to remove a foreign body. While I have described my improved localizer as being primarily useful for locating foreign bodies, it will be apparent to those skilled in the art that it is useful for other operations such as plotting retinal tears in the eye, locating lesions and outlining their size, etc.

While I have shown my invention in but one form, it will be obvious to those skilled in the art that it is not so limited, but is susceptible of various changes and modifications, without departing from the spirit thereof, and I desire therefore that only such limitations shall be placed thereon as are specifically set forth in the appended claims.

What I claim is:

1. In an instrument for localizing foreign bodies in the eye, an ophthalmoscope embodying a head having an observation aperture at the forward edge thereof, a hollow transparent hemispherical bulb mounted on the head rearwardly of the aperture with its polar axis parallel to the line of vision through the aperture, said bulb containing a liquid and an air bubble, and reference lines on the curved surface of the bulb dividing the same vertically and radially.

2. An instrument as defined in claim 1 in which the radial reference lines are numbered from 0 to 180° commencing at the point on said bulb closest the observation aperture.

3. In an instrument for localizing foreign bodies in the eye embodying an ophthalmoscope having a disc-like head with an observation aperture adjacent the forward edge of the head and a handle on the rear thereof, the combination of a hollow hemispherical bulb of transparent material secured to the head adjacent the center thereof and between the handle and aperture, said bulb containing a liquid and an air bubble and having its polar axis disposed normal to the plane of said head, radially extending reference lines on the curved surface of the bulb dividing the same into equiangular segments, said lines being numbered from 0 to 180° clockwise and counter-clockwise as the bulb is viewed in plan, the 0 point being that point on the bulb nearest the aperture, and a plurality of concentric reference lines struck from the pole of the bulb and spaced equiangularly apart and numbered from 0 to 90° from the pole of the bulb downwardly.

4. In an instrument for localizing foreign bodies in the eye embodying an ophthalmoscope having a disc-like head with an observation aperture adjacent the forward edge of the head and a handle on the rear edge thereof, the combination of a hollow hemispherical bulb having therein a liquid and an air bubble, means to secure the bulb to the center of the head between the handle and aperture with its flat side adjacent the head and with the polar axis of the bulb normal to the plane of the head, and reference lines on the curved surface of the bulb dividing the same horizontally and radially and by means of which the direction and degree of inclination of the polar axis from the vertical may be determined by noting the position of said bubble relative to said lines.

5. In an instrument for localizing foreign bodies in the eye, an ophthalmoscope embodying a head having an observation aperture therethrough, a universal level in the form of a hemispherical bulb of transparent material containing liquid and an air bubble mounted on the head adjacent the aperture with its polar axis parallel to the line of sight through the aperture, and indicia on the bulb for determining deviations of the polar axis of the bulb from the vertical by reference to the position of said bubble.

DAVID A. McCOY.

REFERENCES CITED

The following references are of record in the file of this patent:

UNITED STATES PATENTS

| Number | Name | Date |
|---|---|---|
| 807,382 | Hogan | Dec. 12, 1905 |
| 970,360 | Whigham | Sept. 13, 1910 |
| 2,331,591 | Arnesen | Oct. 12, 1943 |